United States Patent [19]
Jacob et al.

[11] Patent Number: 5,087,133
[45] Date of Patent: Feb. 11, 1992

[54] ARRANGEMENT FOR ATTACHING RUNNING RINGS TO A ROTARY DRUM

[75] Inventors: Werner Jacob, Frankfurt; Martin Schepp, Schweinfurt, both of Fed. Rep. of Germany

[73] Assignee: SKF GmbH, Schweinfurt, Fed. Rep. of Germany

[21] Appl. No.: 647,840

[22] Filed: Jan. 30, 1991

[30] Foreign Application Priority Data

Feb. 7, 1990 [DE] Fed. Rep. of Germany ....... 4003616

[51] Int. Cl.$^5$ .............................................. F16C 23/06
[52] U.S. Cl. ................................... 384/549; 384/557; 384/558
[58] Field of Search ............... 384/549, 558, 557, 441, 384/310, 559

[56] References Cited

U.S. PATENT DOCUMENTS

| | | | |
|---|---|---|---|
| 3,648,992 | 3/1972 | Durinck et al. | 384/549 |
| 3,860,303 | 1/1975 | Deussner | 384/549 |
| 4,160,569 | 7/1979 | Reid | 384/549 |
| 5,044,786 | 9/1991 | Jacob et al. | 384/549 |

FOREIGN PATENT DOCUMENTS

2216982 8/1985 Fed. Rep. of Germany .

Primary Examiner—Lenard A. Footland
Attorney, Agent, or Firm—Rosen, Dainow & Jacobs

[57] ABSTRACT

An arrangement for attaching running rings to a rotary drum includes straps which hold the bore surface of the rings on a supporting surface of the rotary drum. The straps are circumferentially spaced apart on at least one of the two sides of the respective ring, and each of the straps has an axial projection with a support surface facing an engagement surface of the ring, the support surface facing radially inward. In order to prevent contact wear between the bore surface of each running ring and the respective supporting surface, each engagement surface and/or support surface is inclined toward the axis of the drum, in the direction extending axially outward of the respective running ring. The support surface of each strap is axially adjustable with respect to the engagement surface of the respective running ring, so that the bore surface of the rings can be pushed locally against the supporting surface of the rotary drum by the straps.

11 Claims, 3 Drawing Sheets

ARRANGEMENT FOR ATTACHING RUNNING RINGS TO A ROTARY DRUM

FIELD OF THE INVENTION

This is invention related to an arrangement for attaching running rings to a drum adapted to rotate on a predetermined axis.

BACKGROUND OF THE INVENTION

German patent No. 2,216,982 discloses a support arrangement for a rotary drum wherein running rings are affixed by plates to supporting surfaces of the rotary drum of a rotary kiln. The plates have lateral projections that are affixed to the supporting surface with straps that are attachable to the rotary drum. This arrangement has the disadvantage that, in a cold start condition, the plates must have some clearance between the bore surface of the ring and the supporting surface of the rotary drum to make allowance for the heating and corresponding thermal expansion that occurs during operation. As a result of this clearance, which is undesirable in itself, the covering plates permit fairly large relative movements between the ring and the supporting surface, especially when a cold rotary drum is started up, so that the ring wears comparatively rapidly at its bore surface and must be replaced frequently.

In addition, in the above arrangement, the installation of individual covering plates between the bore surface of the running ring and the supporting surface of the rotary drum is costly and expensive.

SUMMARY OF THE INVENTION

It is an object of this invention, to provide an arrangement for attaching running rings to a rotary drum of the above discussed type, wherein contact wear between the bore surface of the ring and the associated supporting surfaces of the rotary drum is prevented. In addition, the invention is directed to the provision of an arrangement wherein the running rings are especially simple and economical to replace.

In accordance with the invention, each running ring is urged, at locally delimited peripheral regions, by the support surfaces of the straps against the associated supporting surfaces of the rotary drum.

When the ring is fastened to the supporting surface of a rotary drum that has not been heated by operation, it is bent radially inward at local peripheral points by the straps, so that a friction contact or a small radial clearance between the bore surface of the ring and the supporting surface is produced at these points. As a result, in the cold condition of the rotary drum the ring is prevented from turning on its supporting surface and creeping or sliding. Only in a few exceptional cases must holding lugs or the like, known per se, which engage form-lockingly in corresponding depressions or holes of the ring, be provided on the rotary drum to prevent any harmful relative movement of the running ring on its supporting surface.

When the rotary drum is heated up during operation of the kiln, the drum, which is generally made of steel, undergoes thermal expansion, so that the diameter of the supporting surface thereof becomes somewhat larger. The supporting surface consequently expands radially outward to press on the points of the straps against the section of the bore surface of the running ring that is bent radially inward and at least partially reverses the original radial curvature of the ring. Upon further heating and corresponding greater thermal expansion of the drum, the curvature of the ring at the points of the straps is completely reversed so that a firm friction contact between the bore surface of the ring and supporting surface of the drum is then produced, even in the peripheral region between straps that are adjacent one another.

The running ring is thus unable to move on its supporting surface so that the production of harmful contact wear on the supporting surface is prevented in all operating conditions of the rotary drum. In addition, rings worn on their bearing surfaces may be replaced simply and economically by loosening the straps, removing the old ring, inserting the new ring and remounting the straps.

In one arrangement in accordance with the invention, the straps are attached to the rotary drum with pins or bolts and are axially adjustable with respect to the running ring. In this arrangement a bolt head is preferably connected in one piece with each pin or each bolt, or a nut capable of being screwed on a threaded section of the bolt holds the respective strap from the axially outside and presses it in the direction of the facing shoulder surface of the rotary drum. Then the support surface of the strap is slipped onto the associated engagement surface of the ring with a definite force and fastened.

In a further arrangement in accordance with the invention, the pins or bolts press, with elastic prestress, against the support surface of the respective strap onto the engagement surface of the running ring. The ring is accordingly able to expand somewhat in the radial and axial directions, so that its engagement surface slides slightly on the support surface. Harmful excessive stress on the straps and bolts upon thermal expansion of the rotary drum and ring in operation is thereby prevented.

In a still further arrangement, each individual strap is held fast at an undercut surface of the rotary drum, concentric with the axis of the drum. Upon axial adjustment of the straps and pressing of their support surfaces on the respective engagement surface of the running ring, a contact force that is directed inward away from the strap oblique to the axis of rotation, is produced between these two surfaces. The strap is loaded by a radial force component of this contact force which presses the clamping surface of the strap against the undercut surface of the rotary drum. In this manner the tension stressed bolts or pins are not loaded by radially directed transverse forces. The bolts and pins may accordingly have a space-saving small shaft diameter.

In a further arrangement in accordance with the invention, an especially simple and economically shaped undercut surface is provided on the annular discs and the respective clamping surfaces of the straps.

In a still further arrangement in accordance with the invention, the support surface of each strap forms a fairly large contact surface with the engagement surface of the bottom section of the running ring. Below its engagement surface, the bottom section may be relatively thin walled so that it yields slightly in the radial inward direction when the straps are adjusted.

A simplification of the installation of the running rings on and removal from the annular discs is obtained when the individual straps for fastening the ring on its supporting surface are only attached to the annular disc on one of the two sides of the ring, by bolts or the like.

At least a portion of the straps may be outwardly bendable in the region of their axial projection when contact forces action thereon obliquely to the axis of the running ring between the engagement surface or surfaces of the ring and the support surfaces of the straps, become very large.

In another arrangement in accordance with the invention, the supporting surface for the running ring comprises an annular disc having an inner marginal portion joined to an outer marginal portion by comparatively yielding cross pieces. As a result, the shell of the drum can expand in the radial direction in operation, due to thermal expansion, along with the inner marginal portion, without excessive simultaneous expansion of the radially outer marginal portion. In this arrangement, heat is dissipated from the inner marginal portion, by way of the cross pieces, to the outer marginal portion of the disc. The junctions of adjacent cross pieces and the outer marginal portion are located intermediate adjacent spaced apart straps. As a result, when the drum is heated, the peripheral region of the outer marginal portion intermediate the straps is heated and expanded before the region to which the straps are connected, so that a friction locking fixed seat between the running ring and the annular disc first occurs in the region between the straps.

Finally, in a further embodiment of the invention wherein the two running rings are concentric and axially spaced apart, the running rings may be attached to the annular discs in common in an especially fast and simple manner by employing long bolts extending between the straps held to the two rings.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
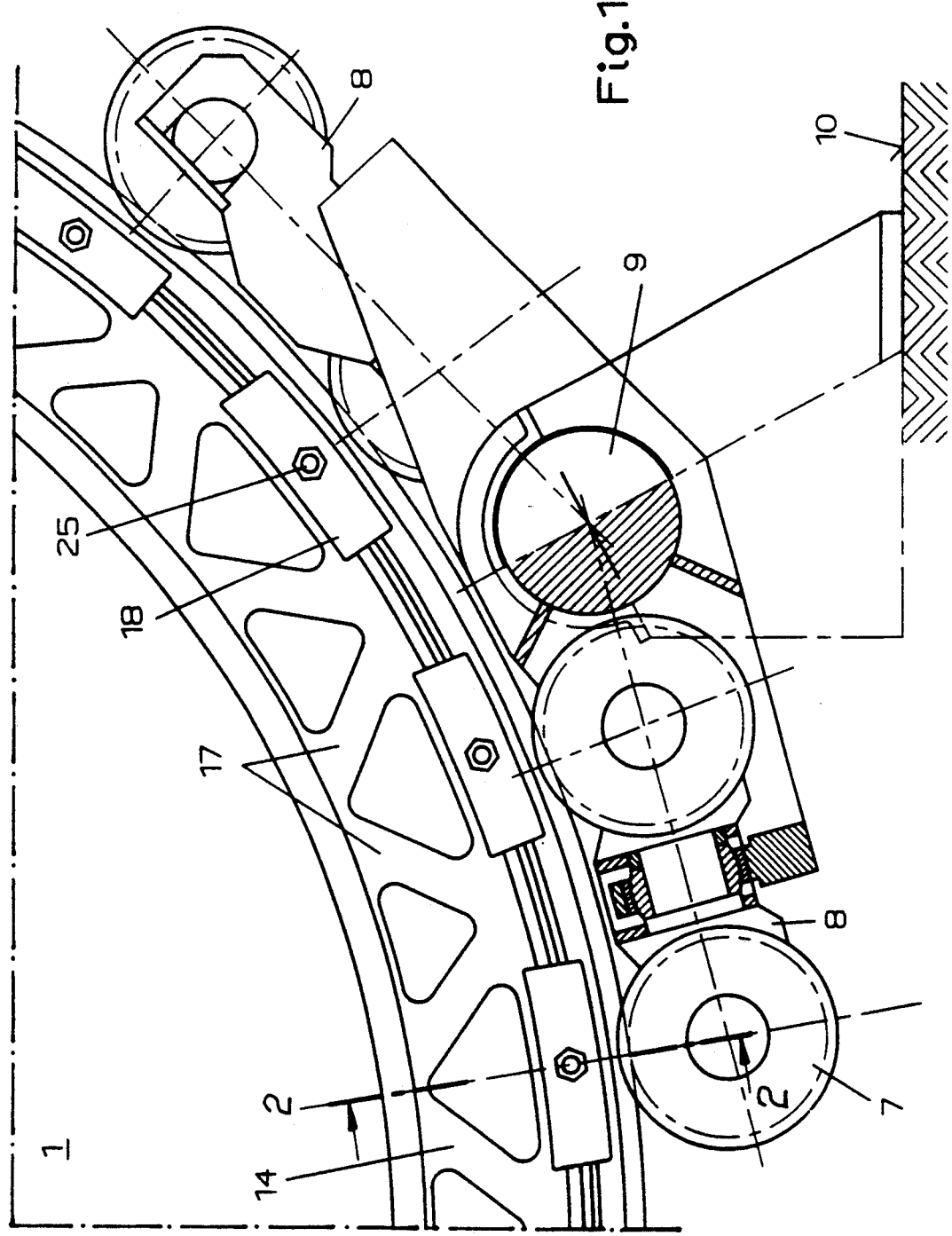
FIG. 1 is a partial sectional view of one half of a rotary drum bearing in accordance with the invention.
Figure 2:
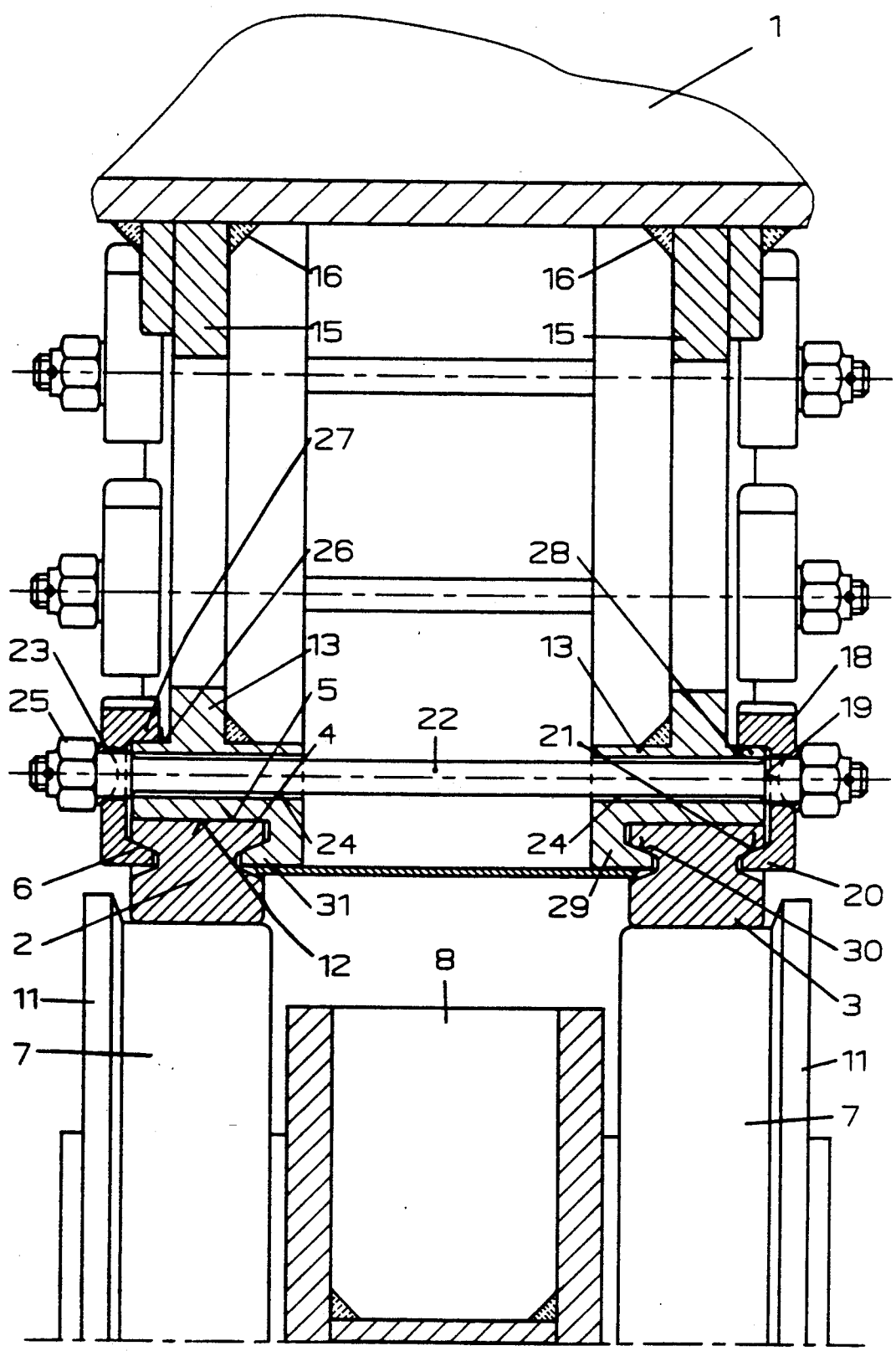
FIG. 2 is a sectional view taken along the line B—B of FIG. 1.

Referring now to the drawings, FIGS. 1 and 2 illustrate the lower portion of one of the two halves of a bearing arrangement for a rotary drum of a rotary kiln. The bearing arrangement includes two identical concentric running rings 2, 3 spaced axially with respect to one another, made for example of conventional rolled rail sections for traveling crane wheels by bending and welding the ends of the rails. The rings may be made of tempered or hardened rail steel.

The two running rings 2, 3 each have a base section 4 adjacent a cylindrical bore surface 5, and an inclined engagement surface 6 at each side of the respective ring on a relatively thin walled lateral projection of the base section 4. The surfaces 6 are inclined, in the direction extending axially outward thereof, toward the axis of the drum. In addition the rings 2,3 each have a head section radially outward of the axis of the drum, and rollers 7 are positioned to roll on the outward surfaces of the head sections of the rings 2,3. The rollers 7 are mounted to rotate in pivoting rockers 8, the rockers 8 being pivotably supported on an axially displaceable main shaft 9, to thereby support the drum 1 on a base 10.

The bore surface 5 of each running ring 2,3 is held against the cylindrical radially outer surface 12 of a separate annular disk 14. The disks 14 have radially inner marginal sections 15 that are fixedly attached to the drum, for example by weldments 16, and radially inner marginal sections 13.

The radially inner marginal sections 15 and the radially outer marginal sections 13 are interconnected by thinner cross pieces 17, to form a unitary element. The cross pieces 17 extend radially outward from the circumference of the inner marginal sections 15 to the outer marginal section 13, with alternate opposite inclinations.

The running rings 2,3 are held fixed on the respective supporting surfaces 12 of the discs 14 by straps 18 mounted adjacent the axial sides of the running rings. The straps are circumferentially spaced apart along flat shoulder surfaces 19 formed on the outer marginal sections 13. These shoulder surfaces are on the axially outer sides of the respective discs 14, and directly adjoin the respective supporting surface 12.

The cross pieces 17 of each annular disk 14 are positioned with the cross pieces being attached to the outer marginal section 13 at positions between adjacent straps 18, in other words the junctions marginal section 13 are intermediate two circumferentially adjacent straps 18.

Each strap 18 has a radially outer projection 20 directed toward the shoulder surface 19, and a support surface 21 thereon directed radially inward. The support surfaces 21 face the respective engagement surfaces 6 and, in the illustrated embodiment of the inventiosn, are inclined to conform to the engagement surfaces 6 so that the two surfaces 21 and 6 are inclined to the axis of the drum at the same angle. The support surfaces 21 of the straps 18 and the engagement surfaces 6 of the associated rings 2,3 are inclined toward the axis of the drum, in the direction extending axially outward of the respective running rings 2,3.

The support surfaces 21 of the straps 18 cooperate in a force locking manner with the engagement surfaces 6 of the base sections 4 of the running rings 2,3. For this purpose, the straps 18 are mounted to be adjustable in the axial direction, so that their support surfaces 21 can be adjusted axially with respect to the engagement surfaces 6. Upon adjustment of the straps 18, at least the lateral projection of the base section 4 that supports the engagement surfaces 6, can be bent radially inward plastically or elastically, and the bore surface 5 of the respective ring 2,3 can be forced against the supporting surface 12 of the disc 14 at the positions of the straps, i.e. locally.

The axial adjustment of the straps 18 is effected by a tension loaded bolt 22 which is passed through a hole 23 in the strap 18 and engages the strap 18 from the axially outer side, for example by a bolt head or the like. The bolt 22 is closely fit in a bore in the anuular disc 14 adjacent the shoulder surface 19.

In the illustrated embodiment of the invention, a single bolt 22 extends through the bores 24 of the two discs 14, the two holes being coaxial. A nut 25 is screwed on each axial end of the bolt 22, axially outward of the respective strap 18.

If the nuts 25 on the bolt 22 are tightened sufficiently, the strap engaging one ring 2 and the axially aligned strap of the other ring 3 will be mutually pulled toward one another, to be axially adjusted against the respective engagement surfaces 6.

The bolt 22 has a somewhat reduced diameter at its midsection, so that it is elastically expandable at this section.

The shoulder surface 19 of the two annular discs 14 also has a cylindrical undercut surface 26 directed radially inward and circumferentially concentric to the supporting surface 12 of the outer marginal section 13. An axially inwardly extending projection 12 at the radially inner end of each strap 18, on the side thereof toward the shoulder surface 19, holds the strap 18 in the radial direction on the annular disc. In other words, the inner axial projection 27 has a cylindrical section shaped clamping surface 28 facing radially outward which conforms to and engages the undercut surface 26. Each strap 18 is supported in the radial outward direction on the undercut surface 26 by this clamping surface 28.

Each annular disk 14 has, on its inner side facing the straps 18, a single strap 29, extending annularly, which is connected in one piece, i.e. undetachably, to the outer marginal section 13 of the annular disk 14. In operation, this annular strap 29 receives the axial loads which are applied by the flange 11 of the rollers 7 to the running rings 2,3.

Each strap 29 has an inclined support surface 30 formed on an annular circumferential outer extends laterally away from the running ring 2, 3 inclined to the axis of rotation of the rotary drum 1, and contacts the adjacent lateral inclined surface 6 of the ring 30 in a force fit manner. The respective ring 2,3 is axially adjusted and pushed with its facing inclined surface 6 against the support surface 30, the bolt 22 and the straps 18.

Figure 3:
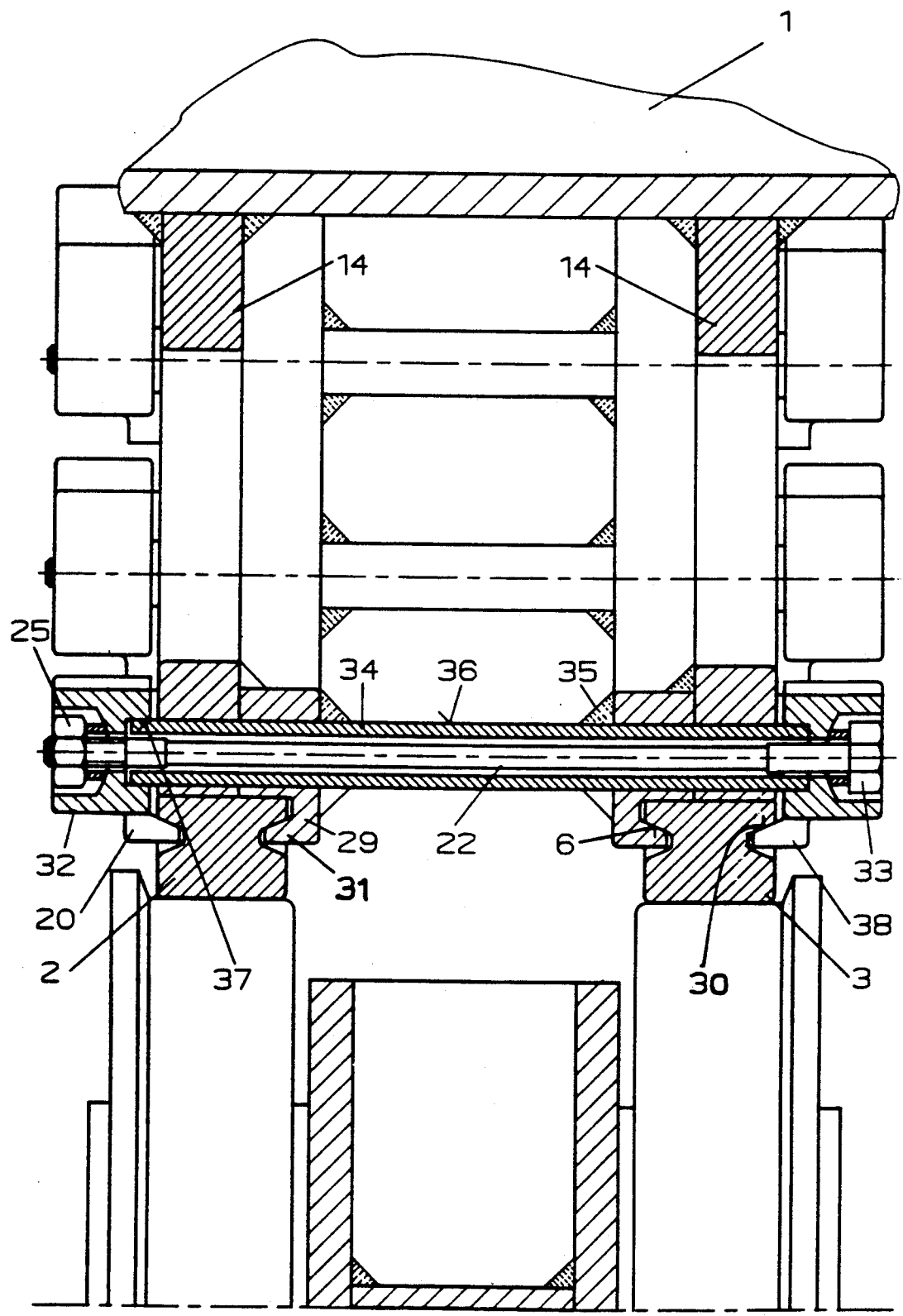
FIG. 3 is a partial sectional view through one half of a rotary drum bearing in accordance with a modification of the invention.

FIG. 3 illustrates a modified arrangement in accordance with the invention, for attaching running rings to a rotary drum 1, wherein, as in the embodiment illustrated in FIGS. 1 and 2, two running rings 2, 3 are concentric and axially spaced apart. In this case, however, the running rings 2, 3 are held to the annular discs 14 by straps 29 and 32.

The bolts 22, at the left side of the drawing, bear a nut 25 and, at their other ends, are provided with bolt heads 33. Two straps 32, 29 facing one another axially, are in each instance axially adjustable with respect to the engagement surfaces 6 by these bolts 22.

In the modified arrangement of FIG. 3, each bolt 22 is surrounded by a cylindrical reinforcing tube 34. The reinforcing tube 34 is firmly undetachably connected to the two annular discs 14. The cylindrical surface of each end of the reinforcing tube is force fit in a continuous cylindrical hole 37 of the strap 32. Each strap 32 is thereby axially displaceable but radially undisplaceable at the respective end of the tube 34. The reinforcing tube surrounds the bolt 22, which may be a thin elastically expansible bolt, and protects it, for example from damage in rough kiln operation.

The straps 32 are made of an elastic steel. They have at least one axially continuous slot 38 that is open radially outward, in the region of their outer axial projection 20.

The two above described embodiments of the invention may be structurally modified without departing from the scope of the invention. For example, the straps 18, 32 may be alternately arranged on opposite sides of the running rings 2, 3, at a mutual distance apart. These straps may be mutually tightened toward one another by bolts or the like. The bolts may be capable of being screwed into a threaded hole on the shoulder surface of the annular discs 14, so that the head of each bolt acts from the axially outer side on only one of the straps and adjusts it with one or a plurality of support surfaces against the respective engagement surface of the running ring.

Alternatively it is satisfactory if either the engagement surface of the ring or the support surface or surfaces of the strap cooperating in a force locking manner with the engagement surface, extend away from the ring obliquely to the axis of rotation of the drum. In each of the two cases, the contact of the inclined engagement surface or of the inclined support surface with the associated support surface or engagement surface produces a contact force directed at an angle inclined to the axis of rotation. This contact force forces the ring, with its bore surface, against the supporting surface of the rotary drum at a locally delimited peripheral region.

Instead of bolts, cylinder-piston devices, operating hydraulically, which adjust the individual straps axially with their support surfaces against the respective engagement surfaces of the running ring, may alternatively be mounted at the periphery of the ring.

Finally, straps need not be arranged on both sides of the rings. Instead, a flat shoulder surface extending continuously radially outward may alternatively be provided on one of the two sides. The corresponding shoulder may be firmly undetachably connected undetachable to the rotary drum. The respective ring will then be axially supported on the flat shoulder surface, but not held fast thereon in the radially outward direction.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. In an arrangement for mounting a running ring to a drum adapted to rotate about a predetermined axis wherein a bore surface of the running ring is held to a supporting surface means carried by the drum by circumferentially spaced straps mounted laterally on at least one side of the ring, the straps having radially outer projections that extend axially toward the ring and have support surfaces that are directed radially inwardly toward an engagement surface on one side of the ring, the improvement wherein
    at least one of the engagement surface of the ring and the support surfaces of the straps that engage the engagement surface extend, in the direction axially outward of said one side of the ring, toward the axis of rotation, and comprising
    means for axially adjusting the support surface of each strap with respect to the engagement surface, the bore surface of the ring pressing locally against a supporting surface of said supporting surface means.

2. The arrangement of claim 1 wherein said means for axially adjusting comprises at least one tension bolt extending through a hole in the respective strap and engaging a bore in a shoulder surface of the supporting surface means, said bolt having a head that engages the axially outer side of said strap.

3. The arrangement of claim 2 wherein said bolt is elastically extensible.

4. The arrangement of claim 2 wherein said shoulder surface has a circumferentially extending undercut surface directed radially inward and concentric with said supporting surface, and comprising an axially inward directed projection on the radially inner side of each said strap, said axially inward directed projection having a clamping surface supported radially on said undercut surface.

5. The arrangement of claim 4 wherein said undercut surface and the radially outer surface of said axially inward directed projection have the shapes of conforming sections of a cylinder.

6. The arrangement of claim 1 wherein a single inclined circumferentially extending engagement surface is formed on each side of the running ring on a base section thereof, said inclined engagement surfaces conforming to inclined support surfaces of the straps.

7. The arrangement of claim 1 wherein a single arcuate strap, concentric with the drum, is fixedly arranged on said supporting surface means on the side of the ring opposite the straps.

8. The arrangement of claim 1 wherein at least one of the straps arranged at the periphery of the running ring is made of an elastic material and has at least one radially outward open slot in the region of the respective radially outer projection thereof.

9. The arrangement of claim 1 wherein said supporting surface means comprises an annular disc having a radially outer portion affixed to a radially inner portion by circumferentially distributed cross pieces, said cross pieces being affixed to said radially outer portion at regions between adjacent straps, said radially inner portion being welded to said drum.

10. In an arrangement for mounting first and second running rings to a drum adapted to rotate about a predetermined axis wherein bore surfaces of the running rings are held to supporting surface means carried by the drum by circumferentially spaced straps mounted laterally on at least one side of each ring, the straps having radially outer projections that extend axially toward the respective ring and have support surfaces that are directed radially inwardly toward an engagement surface on one side of the respective ring, the improvement wherein at least one of the engagement surfaces of each ring and the support surfaces of the straps that engage the engagement surfaces thereof extend, in the direction axially outward of said one side of the respective ring, toward the axis of rotation, and further comprising means for axially adjusting the support surface of each strap with respect to the respective engagement surface, the bore surfaces of the rings pressing locally against respective supporting surfaces of said supporting surface means.

11. The arrangement of claim 10 wherein said supporting surface means has first and second axially spaced apart supporting portions with first and second supporting surfaces, respectively, thereon, for engaging separate running rings, each supporting portion having a shoulder surface, a bore in each in the other supporting portion, and wherein said means for axially adjusting comprises a bolt passing through said coaxial bores and aligned straps on said first and second rings.

* * * * *